United States Patent
Choi

(10) Patent No.: US 9,420,084 B2
(45) Date of Patent: *Aug. 16, 2016

(54) MOBILE TERMINAL AND METHOD OF DISPLAYING IMAGE USING THE SAME

(71) Applicant: Samsung Electronics Co., Ltd., Gyeonggi-do (KR)

(72) Inventor: Sung Keun Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

This patent is subject to a terminal disclaimer.

(21) Appl. No.: 14/271,312

(22) Filed: May 6, 2014

(65) Prior Publication Data
US 2014/0240598 A1  Aug. 28, 2014

Related U.S. Application Data

(63) Continuation of application No. 13/549,263, filed on Jul. 13, 2012, now Pat. No. 8,718,708, which is a continuation of application No. 12/284,756, filed on Sep. 25, 2008, now Pat. No. 8,787,971.

(30) Foreign Application Priority Data

Oct. 1, 2007 (KR) .............................. 2007-0098816

(51) Int. Cl.
*H04B 1/38* (2015.01)
*H04M 1/725* (2006.01)
(Continued)

(52) U.S. Cl.
CPC ........... *H04M 1/72527* (2013.01); *A63F 13/02* (2013.01); *H04N 1/00283* (2013.01);
(Continued)

(58) Field of Classification Search
CPC .................... H04M 1/72527; H04N 21/43632
USPC ............ 455/557, 559, 550.1, 566; 348/207.1, 348/554, 211.2
See application file for complete search history.

(56) References Cited

U.S. PATENT DOCUMENTS 6,781,635 B1  8/2004  Takeda
7,184,003 B2  2/2007  Cupps et al.
(Continued)

FOREIGN PATENT DOCUMENTS

JP  2001 268180 A  9/2001
JP  2001-352373  12/2001
(Continued)

OTHER PUBLICATIONS

Translated Notification of Decision to Grant dated Feb. 3, 2015 in connection with Korean Patent Application Serial No. 10-2014-0004296; 7 pages.
(Continued)

*Primary Examiner* — Sanh Phu

(57) ABSTRACT

The present invention provides a mobile terminal and a method of displaying an image using the same. A method of displaying an image includes connecting a mobile terminal displaying an image on a screen to a display apparatus through a TV-out cable; terminating the display of the image on the screen by the mobile terminal and displaying supplementary information of the image on the mobile terminal; and displaying the image in the display apparatus by transmitting the image from the mobile terminal to the display apparatus through the TV-out cable. By utilizing a display apparatus for displaying an image, and a display screen of a mobile terminal as a space for controlling the image and displaying supplementary information of the image file, the convenience of a user of the mobile terminal is improved.

18 Claims, 6 Drawing Sheets

(51) Int. Cl.
- *A63F 13/98* (2014.01)
- *H04N 1/00* (2006.01)
- *H04N 5/44* (2011.01)
- *H04N 21/41* (2011.01)
- *H04N 21/414* (2011.01)
- *H04N 21/4363* (2011.01)

(52) U.S. Cl.
CPC ....... *H04N1/00297* (2013.01); *H04N 1/00307* (2013.01); *H04N 1/00318* (2013.01); *H04N 5/44* (2013.01); *H04N 5/4403* (2013.01); *H04N 21/4122* (2013.01); *H04N 21/41407* (2013.01); *H04N 21/43632* (2013.01); *A63F 2300/204* (2013.01); *A63F 2300/301* (2013.01); *H04M 2250/16* (2013.01); *H04N 2201/001* (2013.01)

(56) References Cited

U.S. PATENT DOCUMENTS

| | | | |
|---|---|---|---|
| 7,523,226 | B2 | 4/2009 | Anderson et al. |
| 7,630,724 | B2 | 12/2009 | Beyer, Jr. et al. |
| 7,835,505 | B2 | 11/2010 | Toyama et al. |
| 7,911,493 | B2 | 3/2011 | Sarma |
| 7,962,854 | B2 | 6/2011 | Vance et al. |
| 8,209,736 | B2 | 6/2012 | Huang et al. |
| 8,718,708 | B2 * | 5/2014 | Choi .............................. 455/557 |
| 2004/0095600 | A1 | 5/2004 | Nitta et al. |
| 2004/0206528 | A1 | 10/2004 | Wu et al. |
| 2005/0146621 | A1 | 7/2005 | Tanaka et al. |
| 2005/0270283 | A1 | 12/2005 | Plut |
| 2007/0243907 | A1 | 10/2007 | Jin et al. |
| 2008/0018743 | A1 | 1/2008 | Oh et al. |
| 2012/0026395 | A1 | 2/2012 | Jin et al. |

FOREIGN PATENT DOCUMENTS

| | | |
|---|---|---|
| KR | 2003 0082718 A | 10/2003 |
| KR | 10-0744380 | 7/2007 |

OTHER PUBLICATIONS

Office Action dated Sep. 25, 2013 in connection with U.S. Appl. No. 12/284,756.

Non-Final Office Action dated Dec. 21, 2015 in connection with U.S. Appl. No. 14/338,192; 18 pages.

U.S. Office Action issued for U.S. Appl. No. 14/338,192 dated May 20, 2016, 16 pgs.

* cited by examiner

MOBILE TERMINAL AND METHOD OF DISPLAYING IMAGE USING THE SAME

CROSS-REFERENCE TO RELATED APPLICATION(S) AND CLAIM OF PRIORITY

This application is a continuation of U.S. patent application Ser. No. 13/549,263, filed Jul. 13, 2012, which is a continuation of U.S. patent application Ser. No. 12/284,756, filed Sep. 25, 2008, which claims priority to an application entitled "MOBILE TERMINAL AND METHOD OF DISPAYING IMAGE USING THE SAME" filed in the Korean Intellectual Property Office on Oct. 1, 2007 and assigned Serial No. 2007-0098816, the contents of which are incorporated herein by reference.

TECHNICAL FIELD OF THE INVENTION

The present invention relates to a mobile terminal and a method of displaying an image using the same, and more particularly, to a mobile terminal for controlling an image and displaying supplementary information of the image while displaying the image on a separate display apparatus, and a method of displaying an image using the same.

BACKGROUND OF THE INVENTION

The mobile terminal market is very rapidly growing due to new technologies and new functions attracting customers' interest. In particular, the mobile terminal can now provide various applications beyond a simple application according to the development of technologies, and thereby a user of the mobile terminal can utilize audio information, character information, image information, MP3 (Moving Picture Experts Group (MPEG) Player 3), and games using a mobile terminal.

However, when watching a movie by playing an image file using a mobile terminal, the user may experience inconvenience watching the movie due to a small display area of the mobile terminal. Mobile terminals providing a TV-out function have been introduced to solve such inconvenience.

If a mobile terminal having a TV-out function is connected to a television through a TV-out cable, the user may watch a movie through a television having a wide screen, because an image being played by the mobile terminal is displayed on the television in the original format of the image. While the mobile terminal performs a TV-out function, the screen of the mobile terminal may be switched off or may display the same image as the television.

Switching off the screen of the mobile terminal or displaying the same image as the television while using a TV-out function has a disadvantage that the screen space of the mobile terminal cannot efficiently be utilized to provide the user with further information and convenience. Further, when the mobile terminal displays the same image as the television, the mobile terminal consumes its limited source of electric power to display the same image.

SUMMARY OF THE INVENTION

To address the above-discussed deficiencies of the prior art, it is a primary object of the present invention to utilize a screen of a display unit of a mobile terminal for another function while using a TV-out function.

Another object of the present invention is to display supplementary information of an image on a display unit of a mobile terminal while using a TV-out function.

Another object of the present invention is to improve user convenience of a mobile terminal having a TV-out function.

Another object of the present invention is to utilize a separate display apparatus for displaying an image, and a display screen of a mobile terminal as a space for controlling the image and displaying supplementary information of the image.

According to an exemplary embodiment of the present invention, a method of displaying an image using a mobile terminal includes: playing an image file using an image control window of the mobile terminal and displaying an image in an image display window of the mobile terminal while the mobile terminal is connected to a display apparatus through a TV-out cable; transmitting an image information of the image file playing on the mobile terminal to the display apparatus through the TV-out cable and displaying the image information on the display apparatus; and terminating the display of the image on the image display window and maintaining the image control window in the display unit of the mobile terminal for controlling the play of the image file.

According to another exemplary embodiment of the present invention, a method for displaying an image includes: connecting a mobile terminal displaying an image on a screen to a display apparatus through a TV-out cable; terminating the display of the image on the screen by the mobile terminal and displaying supplementary information of the image on the mobile terminal; and displaying the image on the display apparatus by transmitting the image from the mobile terminal to the display apparatus through the TV-out cable.

According to another exemplary embodiment of the present invention, a mobile terminal includes: a display unit for displaying an image display window and an image control window, wherein the image display window displays an image of a playing image file and the image control window allows control of the play of the image file; a TV-out terminal for outputting the image displayed on the display unit; and if the TV-out terminal is connected to a display apparatus through a TV-out cable, a control unit for transmitting an image information of the playing image file to the display apparatus through the TV-out cable, and for terminating the display of the image of the playing image file on the image display window.

According to another exemplary embodiment of the present invention, a mobile terminal includes: a display unit for displaying an image; a TV-out terminal for outputting the image displayed on the display unit; and if the TV-out terminal is connected to a display apparatus through a TV-out cable, a control unit for transmitting the image displayed on the display unit of the mobile terminal to the display apparatus through the TV-out cable, and for terminating the display of the image on the display unit and displaying supplementary information of the image on the display unit.

According to the present invention, when using a TV-out function, an image received from a mobile terminal is displayed on a display apparatus, and a display unit of the mobile terminal displays an image control window for controlling the image displayed on the display apparatus and for displaying supplementary information of the image. The user can thereby watch an image through the display apparatus having a large screen, control the image displayed on the display apparatus by using the mobile terminal, and identify supplementary information of the display image, thereby improving the user's convenience.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile terminal.

Figure 1:
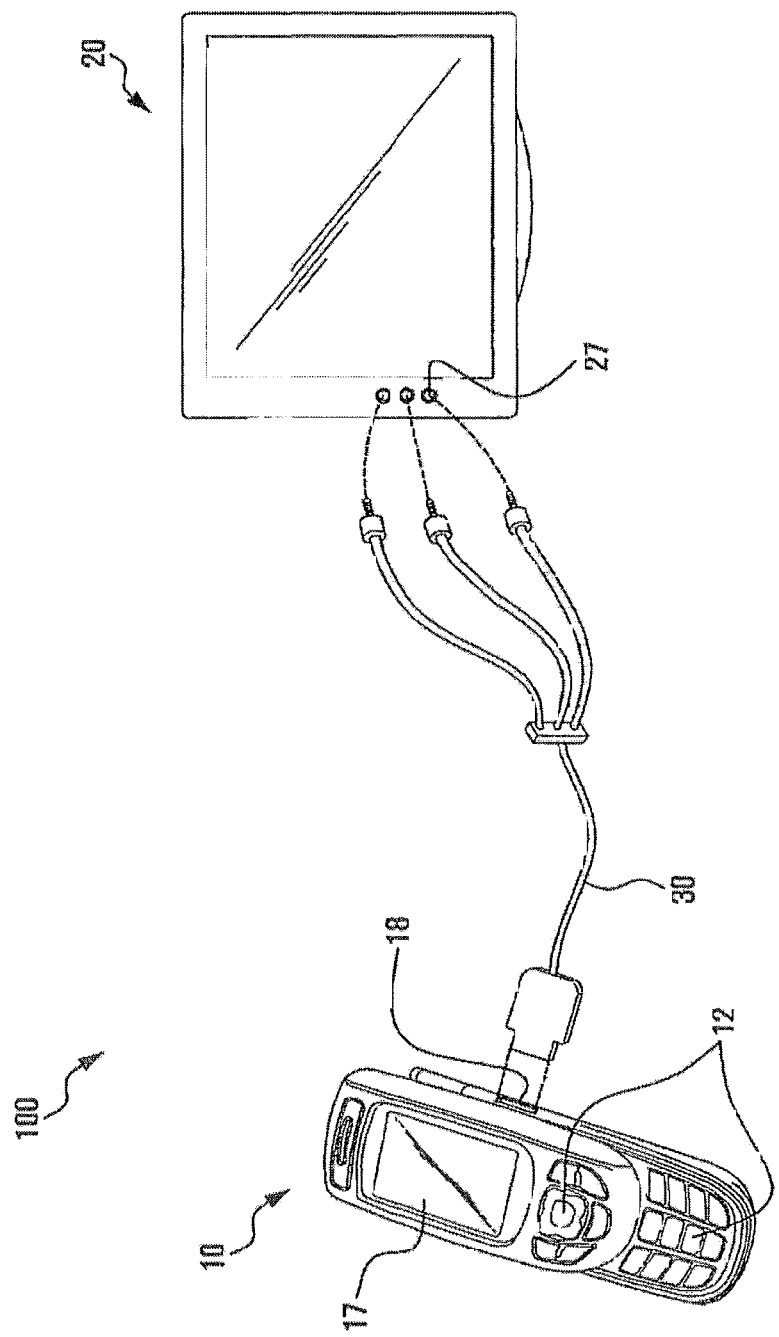
FIG. 1 is a schematic drawing showing an image display system according to an exemplary embodiment of the present invention.
Figure 2:
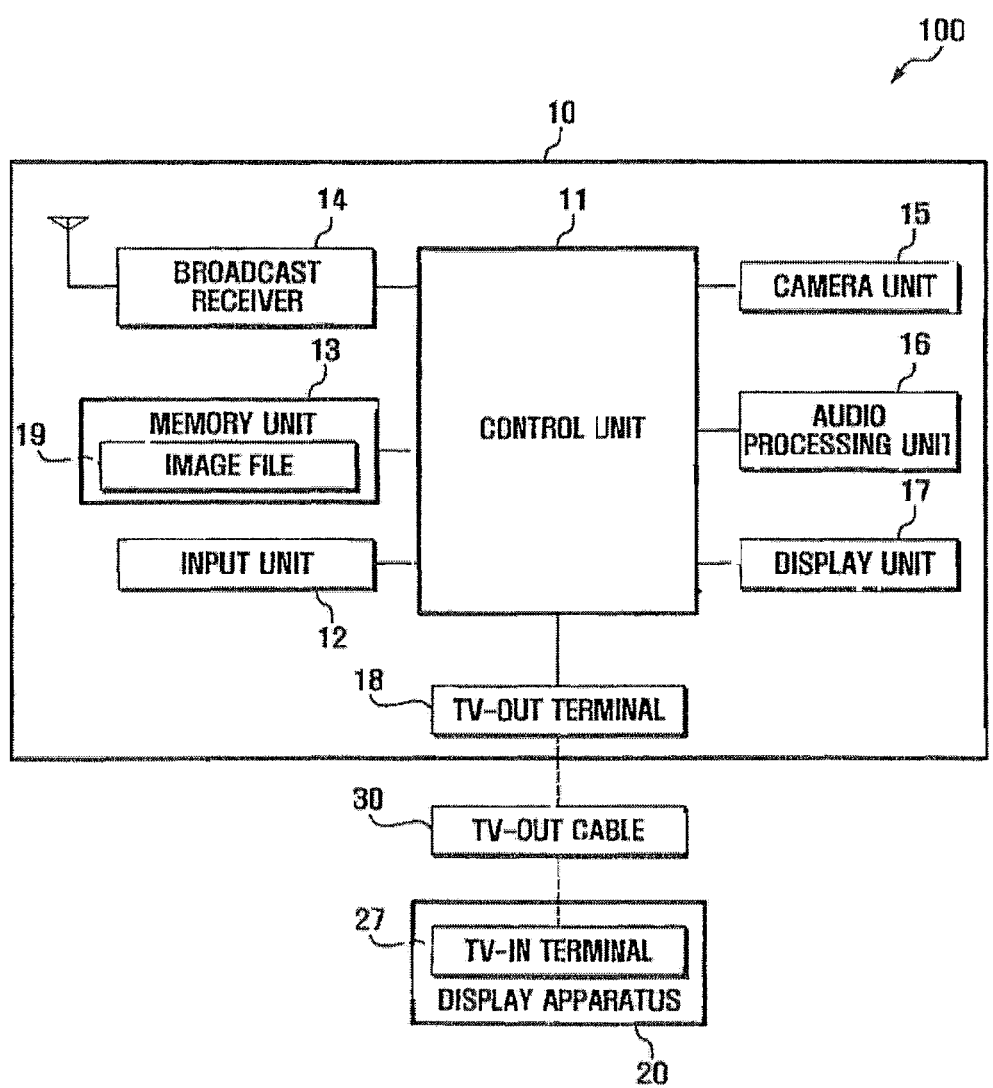
FIG. 2 is a block diagram showing a configuration of the image display system of FIG. 1.

Referring to FIGS. 1 and 2, an image display system 100 according to an exemplary embodiment of the present invention includes a mobile terminal 10 and a display apparatus 20 connected through a TV-out cable 30. When the mobile terminal 10 and the display apparatus 20 are connected through the TV-out cable 30, the display apparatus 20 displays an image received from the mobile terminal 10, and a display unit 17 of the mobile terminal 10 displays an image control window for controlling the image being displayed on the display apparatus 20 and for displaying supplementary information of the image.

The mobile terminal 10 is an image display terminal having a TV-out terminal 18, and includes a control unit 11, an input unit 12, a memory unit 13, a broadcast receiver 14, a camera unit 15, an audio processing unit 16, and a display unit 17.

The mobile terminal 10 can play an image file 19 and a received broadcast image, and may be a mobile phone, smart phone, PDA (personal digital assistant), mobile broadcast receiver such as a DMB (digital multimedia broadcasting) receiver, MP3 player, and PMP (portable multimedia player).

The TV-out terminal 18 is a connector of the mobile terminal 10, and is connected to an end of the TV-out cable 30. The TV-out terminal 18 connects the control unit 11 of the mobile terminal 10 to the display apparatus 20 connected to the other end of the TV-out cable 30.

The control unit 11 includes a microprocessor for controlling general operation of the mobile terminal 10, and controls a TV-out function through the TV-out cable 30.

The input unit 12 includes a plurality of keys for the operation of the mobile terminal 10, and outputs a signal generated by a user's key selection to the control unit 11. A user command generated through the input unit 12 may be a command for playing an image file or a command for receiving a broadcast. The input unit 12 may be a keypad, a touch pad, or a touch screen.

The memory unit 13 is configured with a plurality of volatile memories and a plurality of non-volatile memories, and stores programs for controlling the mobile terminal 10 and data generated during execution of the programs. The memory unit 13 also stores a program for performing a TV-out function, and at least one image file 19.

The image file 19 may be an internal image file provided as a default, an image file taken by the camera unit 15, and an image file downloaded from an external electronic device or from a web server. The image file 19 may include image information, audio information, and supplementary information. The supplementary information may include file information and image content information. The file information may include a type, file size, and resolution of the image file 19. The image content information may be, for example, description, genre, production date, director, and actors of the content of the image file 19.

The broadcast receiver 14 receives a broadcast signal from a broadcasting station through an antenna and outputs the broadcast signal to the control unit 11. The control unit 11 processes the received broadcast signal into image information and audio information, and outputs the image and audio information to the display unit 17 and the audio processing unit 16, respectively.

The camera unit 15 performs a photographing function, and includes a lens, and a CCD (charge coupled device) or CMOS (complementary metal oxide semiconductor) image sensor. In particular, the camera unit 15 outputs image information by taking a picture. The control unit 11 controls the memory unit 13 to store the image information and file information as an image file 19 according to a user's selection signal.

The audio processing unit 16 converts an audio signal input through a microphone to a digital signal, and outputs audio information of an image file 19 and of a broadcast image through a speaker while playing the image file 19 or displaying the broadcast image.

The display unit 17 displays a menu of various functions of the mobile terminal 10 and information stored in the memory unit 13. The display unit 17 may be configured with an LCD (liquid crystal display) as a touch screen. In this case, the touch screen operates as a display unit and an input unit.

The display unit 17 displays an image display window for displaying an image while playing an image file 19, and an image control window for controlling the image being displayed. The image control window displays a control menu, an image information window, and a progress bar. The user may select an image file 19 to be played and control the play of the selected image file 19 through the image control window. When a TV-out function is performed, the display unit 17 may display supplementary information of the image in the image display window instead of playing the image file 19, and may maintain the displayed image control window.

The display unit 17 displays a received broadcast image, and when a TV-out function is performed, the display unit 17 may display supplementary information of the broadcast image in the image display window instead of displaying the broadcast image. The supplementary information of the broadcast image includes channel information and image content information.

The display apparatus 20 includes a TV-in terminal 27 to which an end of the TV-out cable 30 is connected. The TV-in terminal 27 of the display apparatus 20 is connected to the control unit 11 of the mobile terminal 10 through the TV-out cable 30. The display apparatus 20 may be a CRT (cathode ray tube), an LCD, or a PDP (plasma display panel). Additionally, if the display apparatus 20 includes an audio processing unit, audio information received through the TV-out cable 30 may be processed by the audio processing unit.

When the control unit 11 of the mobile terminal 10 is connected to the display apparatus 20 through the TV-out cable 30, image information of an image being played or received by the mobile terminal 10 is transmitted to the display apparatus 20 through the TV-out cable 30. At the same time, the control unit 11 terminates the display of the image information of the image being played or received in the display unit 17. The control unit 11 controls the display unit 17 to maintain the image control window or to display the supplementary information of the image being played or received.

Hereinafter, the TV-out function of the mobile terminal 10 according to an exemplary embodiment of the present invention is described in more detail. The TV-out function displays an image being played or a broadcast image being received by the mobile terminal 10 in the display apparatus 20.

For example, if a program of playing an image file is executed by the mobile terminal 10, the control unit 11 controls the display unit 17 to display an image display window and an image control window. If a specific image file 19 is selected and played through selection from a control menu in the image control window, the control unit 11 controls the display of the playing image in the image display window and the display of play information of the playing image in the image control window. The play information includes a title, play time, and progress time. The title may be displayed in the image information window of the image control window and the play time and the progress time may be displayed in a progress bar.

When the mobile terminal 10 and the display apparatus 20 are connected through the TV-out cable 30, the control units 11 transmits image information of the playing image to the display apparatus 20 through the TV-out cable 30. At this moment, the control unit 11 terminates the display of the image being played in the image display window but maintains the display of the image control window. Further, the display apparatus 20 may process the received image information and display it on a screen.

The control unit 11 may control the display of supplementary information of an image file in the image display window.

Additionally, the mobile terminal 10 displays a received broadcast image in the display unit 17. When receiving a broadcast signal, the mobile terminal receives image information, audio information, and supplementary information together. At this time, if the mobile terminal 10 and the display apparatus 20 are connected through the TV-out cable 30, the control unit 11 transmits the received broadcast image information to the display apparatus 20 through the TV-out cable 30, and terminates the display of the broadcast image in the display unit 17. The control unit 11 may control the display unit 17 to display supplementary information of a broadcast image being received. Further, the display apparatus 20 may process the broadcast image information, and display it on a screen.

The screen of the display apparatus 20 may be optimally used for displaying an image, and the screen of the mobile terminal 10 may be utilized as a space for controlling the image or providing supplementary information of the image, because the image transmitted from the mobile terminal 10 is displayed on the display apparatus 20 and the image control window or supplementary information is displayed on the mobile terminal.

FIGS. 3 to 6 are flow charts showing methods for displaying an image according to exemplary embodiments of the present invention. The configuration of the image display system 100 will become more apparent through the description of the methods of displaying.

Figure 3:
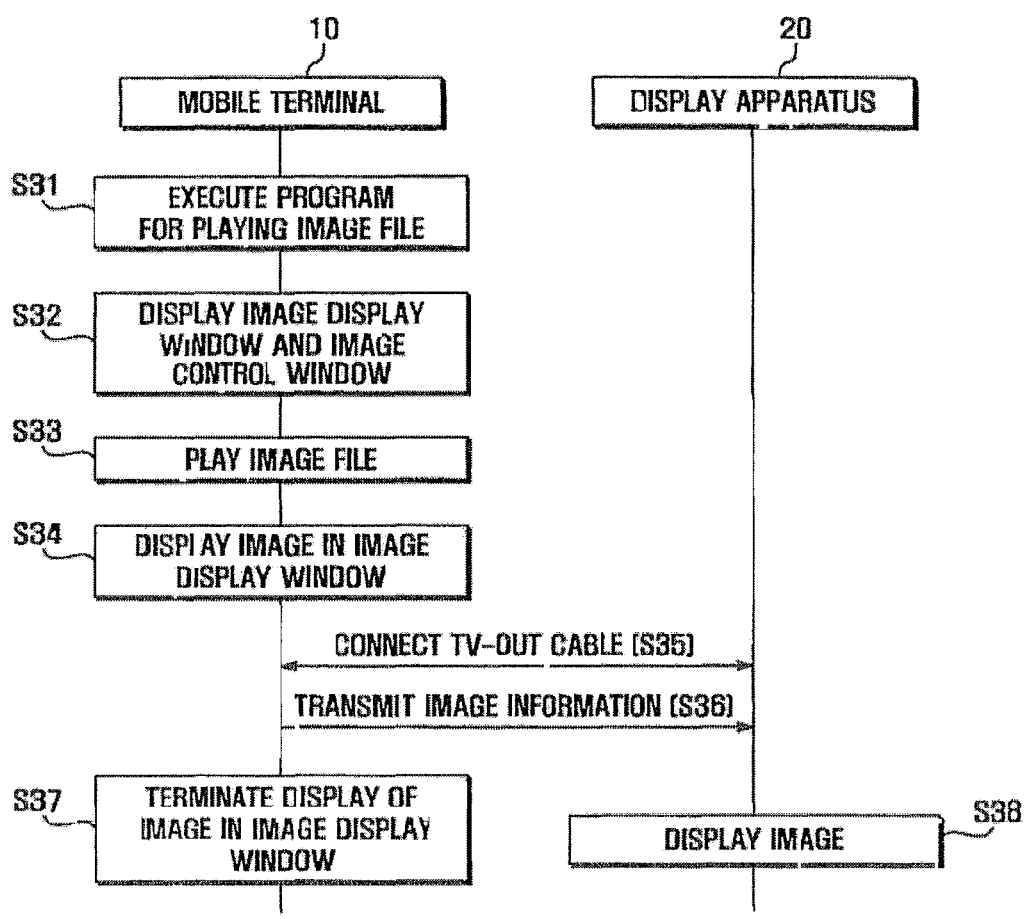
FIG. 3 is a flow chart showing a method for displaying an image according to another exemplary embodiment of the present invention.
Figure 4:
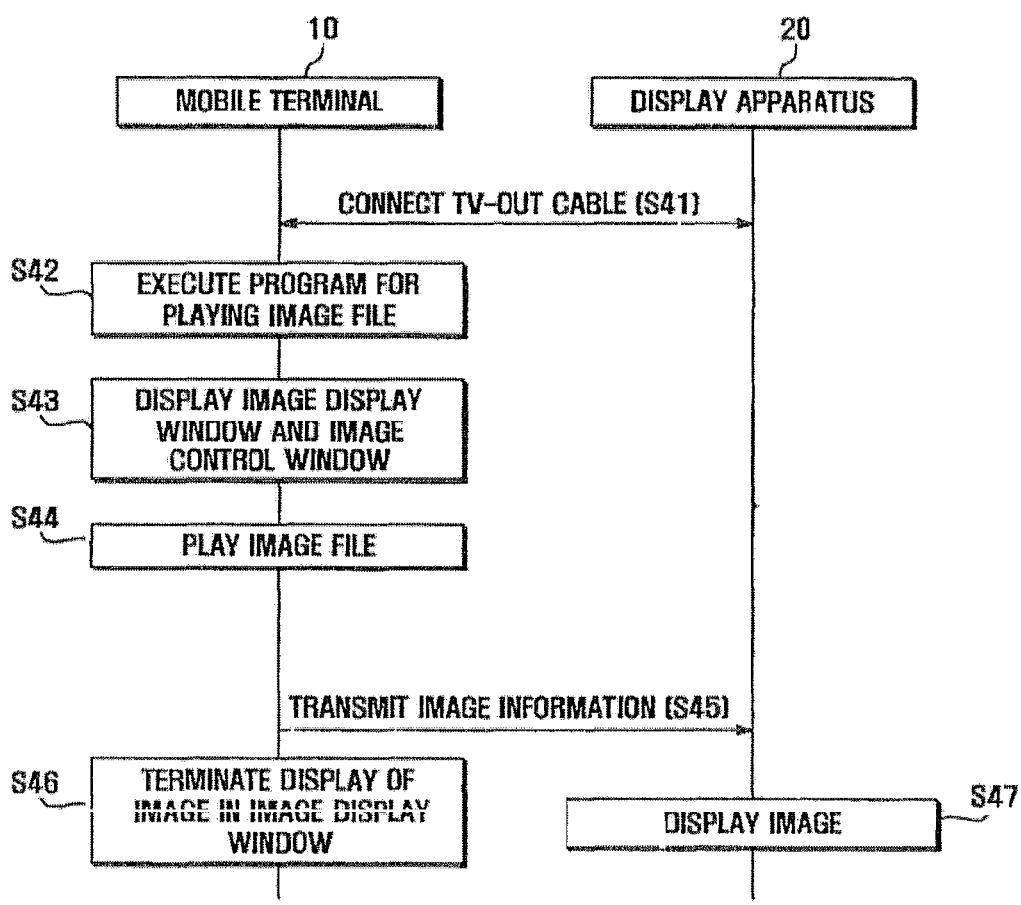
FIG. 4 is a flow chart showing a method for displaying an image according to another exemplary embodiment of the present invention.

FIGS. 3 and 4 show methods of displaying an image while playing an image file. FIG. 3 shows a case in which the TV-out cable 30 is connected after an image file begins playing, and FIG. 4 shows a case in which the TV-out cable 30 is connected before an image file begins playing.

Referring to FIGS. 1 to 3, a user executes a program for playing an image file in the mobile terminal 10 (S31), and the control unit 11 controls the display unit 17 to display an image display window and an image control window (S32).

The user selects an image file 19 and requests for the image file to be played through the image control window (S33), and the control unit 11 controls the display of the image of the selected image file 19 in the image display window (S34). The control unit 11 controls the display of play information of the image file 19 in the image control window. In the case that the selected image file 19 contains audio information, the control unit 11 outputs the audio information to the audio processing unit 16.

The mobile terminal 10 and the display apparatus 20 are then connected through the TV-out cable 30 (S35), and the control unit 11 transmits the image information of the image file 19 to the display apparatus 20 (S36). The control unit 11 terminates the display of the image in the image display window, but maintains the display of the image control window (S37). That is, the control unit 11 controls to maintain the display of the play information in the image control window.

The display apparatus 20 processes the received image information and displays the image on a screen (S38).

Although an example of transmitting only image information to the display apparatus 20 is described at step S36 in the exemplary embodiment, the present invention is not limited thereto. At step S36, the control unit 11 may transmit both image information and audio information to the display apparatus 20. In the case that the display apparatus 20 includes an audio processing unit, the audio processing unit of the display apparatus 20 processes the received audio information and outputs an audio signal outwards.

The example describes terminating the display of the image in the image display window of the display unit 17 at step S37, however the control unit 11 may thereafter display supplementary information of the playing image file 19 in the image display window.

After step S37, the display unit 17 of the mobile terminal 10 may remain in a switched-on state, or may automatically be switched off after elapse of a predetermined time duration. In the latter case, if any key of the input unit 12 is input after the display unit 17 is switched off, the control unit 11 returns the mobile terminal 10 to the screen state of step S37.

Although an example in which the mobile terminal 10 executes step S37 after step S36 is described in the exemplary embodiment, in another exemplary embodiment step S36 may be executed after execution of step S37.

Referring to FIGS. 1, 2, and 4, when the mobile terminal 10 and the display apparatus 20 are first connected through the TV-out cable 30 (S41), the display unit 17 and the display apparatus 20 display an identical image.

The user executes a program for playing an image file in the mobile terminal 10 (S42), and the control unit 11 controls the display unit 17 to display an image display window for playing an image and an image control window (S43). At this time, the display apparatus 20 displays an image display window identical to that displayed on the display unit 17.

Subsequently, the user selects an image file 19 and requests for the image file 19 to be played through the image control window (S44), and the control unit 11 transmits image information of the selected image file 19 to the display apparatus 20 (S45). The control unit 11 then terminates the display of the image in the image display window, but maintains the display of the play information in the image control window (S46).

The display apparatus 20 processes the received image information and displays an image on a screen (S47). That is, the image display window is displayed both in the display unit 17 and in the display apparatus 20. However, the playing image is displayed only in the image display window of the display apparatus 20, and not displayed in the image display window of the display unit 17.

Although an example of transmitting only image information to the display apparatus 20 is described at step S45 in the exemplary embodiment, the present invention is not limited thereto. At step S45, the control unit 11 may transmit both image information and audio information to the display apparatus 20. In the case that the display apparatus 20 includes an audio processing unit, the audio processing unit of the display apparatus 20 processes the received audio information and outputs an audio signal outwards.

The example describes terminating the display of the image in the image display window of the display unit 17 at step S46; however, the control unit 11 may thereafter display supplementary information of the playing image file 19 in the image display window.

After step S46, the display unit 17 of the mobile terminal 10 may remain in a switched-on state, or may automatically be switched off after elapse of a predetermined time duration. In the latter case, if any key of the input unit 12 is input after the display unit 17 is switched off, the control unit 11 returns the mobile terminal 10 to the screen state of step S46.

Although an example in which the mobile terminal 10 executes step S46 after step S45 is described in the exemplary embodiment, in another exemplary embodiment step S45 may be executed after execution of step S46.

Figure 5:
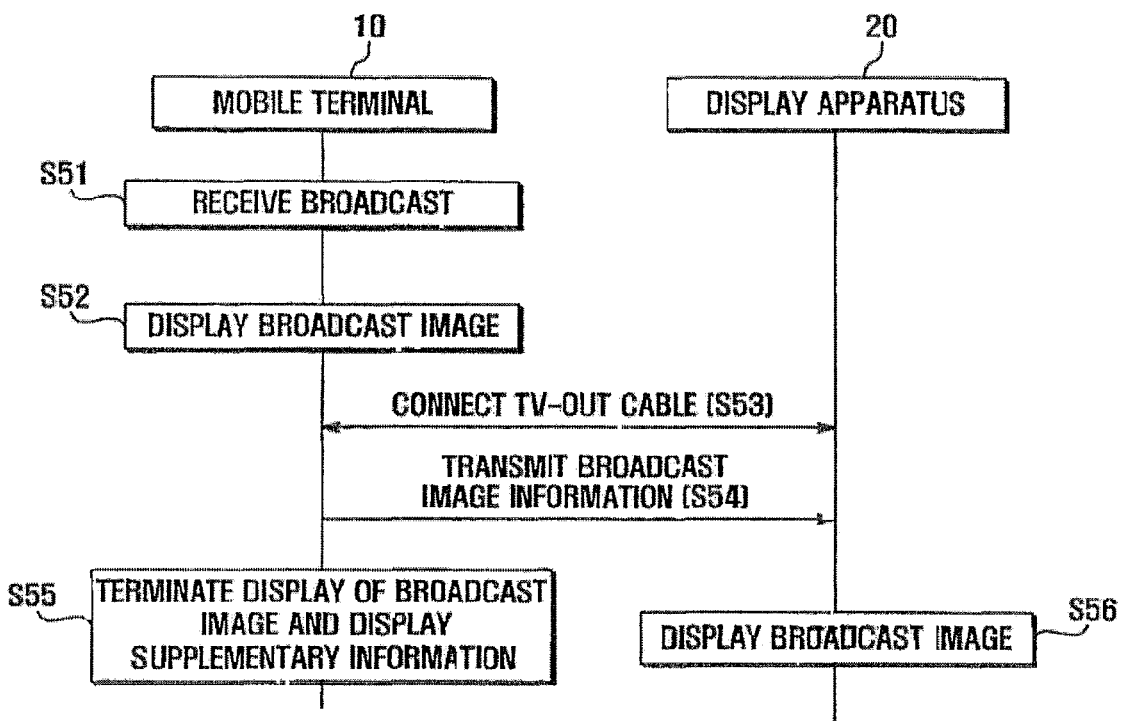
FIG. 5 is a flow chart showing a method for displaying an image according to another exemplary embodiment of the present invention.
Figure 6:
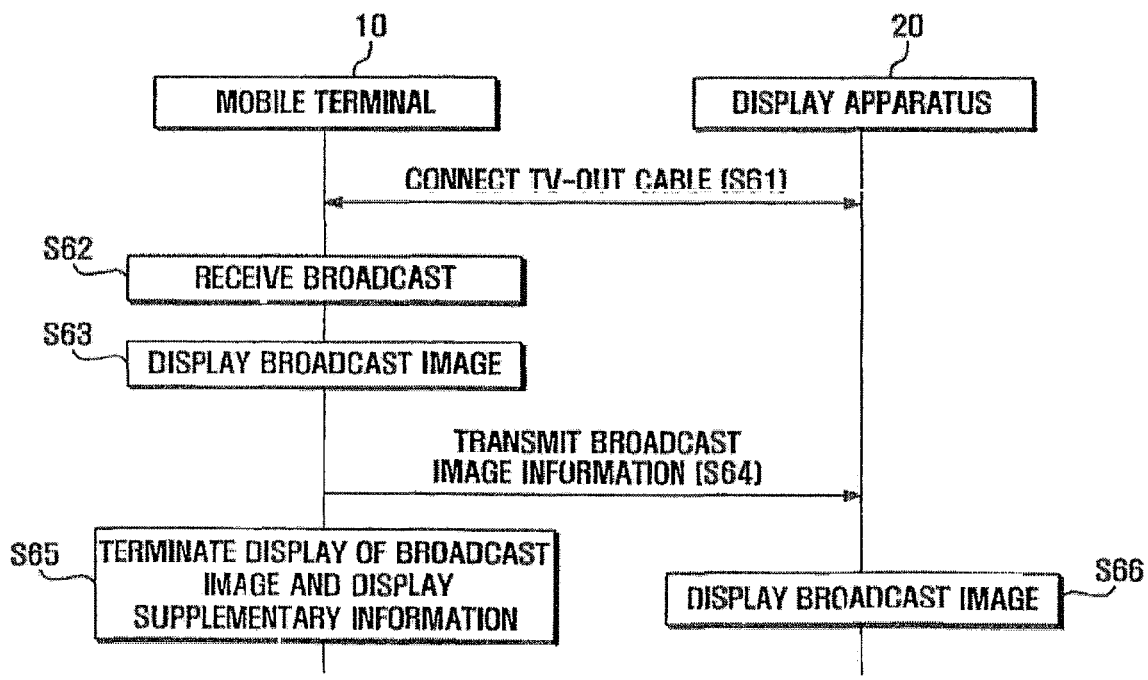
FIG. 6 is a flow chart showing a method for displaying an image according to another exemplary embodiment of the present invention.

FIGS. 5 and 6 show methods of displaying an image while receiving a broadcast. FIG. 5 shows a case in which the TV-out cable 30 is connected after the reception a broadcast begins, and FIG. 6 shows a case in which the TV-out cable 30 is connected before the reception of a broadcast begins.

Referring to FIGS. 1, 2, and 5, broadcast information of a specific channel is received by the broadcast receiver 14 according to a user's selection signal input through the input unit 12 (S51), and the control unit 11 instructs the display unit 17 to display a broadcast image of the corresponding channel (S52). The received broadcast information includes image information, audio information, and supplementary information. The supplementary information includes channel information and image information.

The mobile terminal 10 and the display apparatus 20 are then connected through the TV-out cable 30 (S53), and the control unit 11 transmits the received broadcast image information to the display apparatus 20 (S54). The control unit 11 terminates the display of the broadcast image in the display unit 17 and displays the supplementary information of the corresponding channel (S55). At this time, the control unit 11 may display a control window for controlling the reception of broadcast information and the broadcast image in the display unit 17, in addition to displaying the supplementary information.

The display apparatus 20 processes the received broadcast image information and displays the broadcast image on a screen (S56).

Although an example of transmitting only image information to the display apparatus 20 is described at step S54 in the exemplary embodiment, the present invention is not limited thereto. At step S54, the control unit 11 may transmit both image information and audio information to the display apparatus 20. In the case that the display apparatus 20 includes an audio processing unit, the audio processing unit of the display apparatus 20 processes the received audio information and outputs an audio signal outwards.

After step S55, the display unit 17 of the mobile terminal 10 may remain in a switched-on state, or may automatically be switched off after elapse of a predetermined time duration. In the latter case, if any key of the input unit 12 is input after the display unit 17 is switched off, the control unit 11 returns the mobile terminal 10 to the screen state of step S55.

Although an example in which the mobile terminal 10 executes step S55 after step S54 is described in the exemplary embodiment, in another exemplary embodiment step S54 may be executed after execution of step S55.

Referring to FIGS. 1, 2, and 6, when the mobile terminal 10 and the display apparatus 20 are first connected through the TV-out cable 30 (S61), the display unit 17 and the display apparatus 20 display an identical image.

Subsequently, broadcast information of a specific channel is received by the broadcast receiver 14 according to a user's selection signal input through the input unit 12 (S62), and the control unit 11 instructs the display unit 17 to display a broadcast image of the corresponding channel (S63). The control unit 11 then transmits the received broadcast image information to the display apparatus 20 (S64), and terminates the display of the broadcast image in the display unit 17 and displays the supplementary information of the corresponding channel (S65). At this time, the control unit 11 may display a control window for controlling the reception of broadcast information and the broadcast image in the display unit 17, in addition to displaying the supplementary information.

The display apparatus 20 processes the received broadcast image information and displays the broadcast image on a screen (S66).

Although an example of transmitting only image information to the display apparatus 20 is described at step S64 in the exemplary embodiment, the present invention is not limited thereto. At step S64, the control unit 11 may transmit both image information and audio information to the display apparatus 20. In the case that the display apparatus 20 includes an audio processing unit, the audio processing unit of the display apparatus 20 processes the received audio information and outputs an audio signal outwards.

After step S65, the display unit 17 of the mobile terminal 10 may remain in a switched-on state, or may automatically be switched off after elapse of a predetermined time duration. In the latter case, if any key of the input unit 12 is input after the display unit 17 is switched off, the control unit 11 returns the mobile terminal 10 to the screen state of step S65.

Although an example in which the mobile terminal 10 executes step S65 after step S64 is described in the exemplary embodiment, on another exemplary embodiment step S64 may be executed after execution of step S65.

Figure 7:
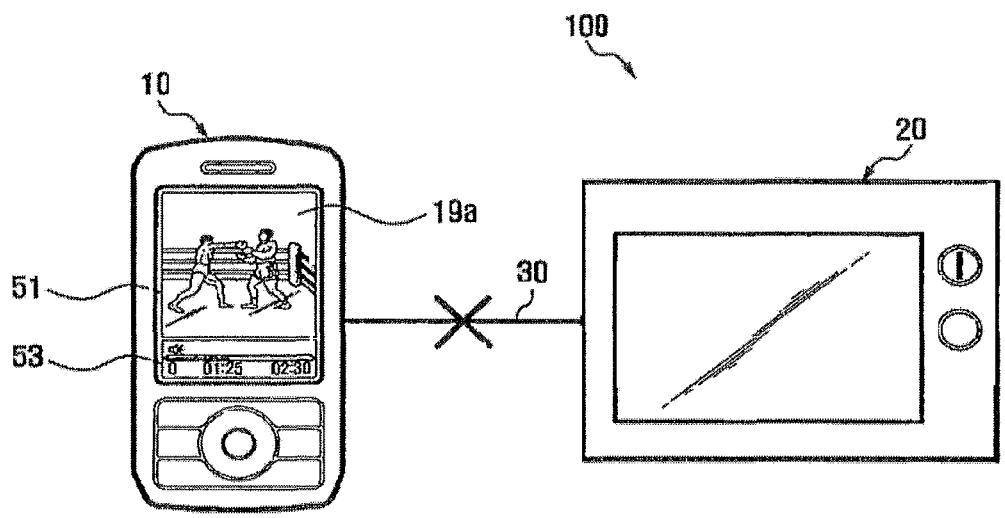
FIGS. 7 and 8 are screen examples displayed in the methods for displaying an image of FIGS. 3 to 6.
Figure 8:
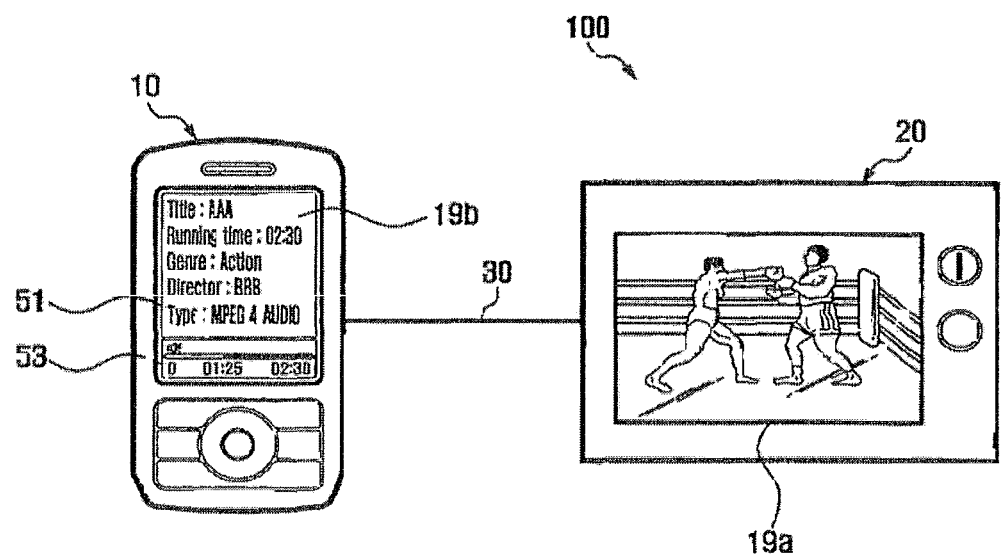

FIGS. 7 and 8 show screen examples of playing an image file 19 stored in the memory unit 13 for the methods for displaying an image of FIGS. 3 and 4.

As shown in FIG. 7, if an image file is played in the state that the mobile terminal 10 and the display apparatus 20 are not connected through the TV-out cable 30, an image display window 51 and an image control window 53 are displayed in the display unit 17. An image 19a of a selected image file is displayed in the image display window 51 and play information of the playing image file is displayed in the image control window 53.

As shown in FIG. 8, if the mobile terminal 10 and the display apparatus 20 are connected through the TV-out cable 30, supplementary information 19b is displayed in the image display window 51 of the mobile terminal 10 instead of the image of the playing image file. The display apparatus 20 then displays the image 19a of the image file received from the mobile terminal 10. At this time, the display of the image control window 53 is maintained so that a user can control the image file through the mobile terminal 10.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A mobile terminal, comprising:
a display;
an output connection configured to connect the mobile terminal to an external display device having a display via a cable;
a receiver configured to receive image data from an external source; and
a controller configured to display, on the display of the mobile terminal, a control menu configured to control play of images corresponding to the image data,
wherein, while the images are being played in the mobile terminal, the controller is configured to:
if the mobile terminal is connected to the external display device, display the images on the display of the external display device without displaying the images on the display of the mobile terminal and display the control menu on the display of the mobile terminal, and
if the mobile terminal is not connected to the external display device, display the images on the display of the mobile terminal.

2. The mobile terminal of claim 1, wherein the image data comprises a broadcast program.

3. The mobile terminal of claim 1, wherein if the mobile terminal is connected to the external display device while the images corresponding to the image data are being played in the mobile terminal, the controller is configured to terminate display of the images on the display of the mobile terminal.

4. The mobile terminal of claim 1, wherein the control menu is displayed in an image control window within a first portion of the display of the mobile terminal and, when the images are displayed on the display of the mobile terminal, the images are displayed in an image display window within a second portion of the display of the mobile terminal that is different from the first portion.

5. The mobile terminal of claim 1, wherein the controller is configured, if the mobile terminal is connected to the external display device while the images are being played in the mobile terminal, to display the images on the external display device and display the control menu on the display of the mobile terminal without displaying the images being played in the mobile terminal on the display of the mobile terminal.

6. The mobile terminal of claim 1, wherein the controller is configured to play the images such that the images are displayed only on the external display device and the control menu is displayed only on the display of the mobile terminal if the external display device is connected to the mobile terminal.

7. The mobile terminal of claim 1, wherein the image data comprises a movie.

8. The mobile terminal of claim 1, wherein the image data comprises a game.

9. The mobile terminal of claim 1, wherein the control menu comprises one or more of a play control, a title, a play time, a progress time, and a progress bar.

10. A method, comprising:
receiving image data from an external source;
displaying, on a display of a mobile terminal, a control menu configured to control play of images corresponding to the image data; and
while the images are being played in the mobile terminal:
if the mobile terminal is connected to an external display device having a display, displaying the images on the display of the external display device without displaying the images on the display of the mobile terminal and displaying the control menu on the display of the mobile terminal; and
if the mobile terminal is not connected to the external display device, displaying the images on the display of the mobile terminal.

11. The method of claim 10, wherein the image data comprises a broadcast program.

12. The method of claim 10, further comprising:
if the mobile terminal is connected to the external display device while the images corresponding to the image data are being played in the mobile terminal, terminating display of the images on the display of the mobile terminal.

13. The mobile terminal of claim 10, further comprising:
displaying the control menu in an image control window within a first portion of the display of the mobile terminal; and
when displaying the images corresponding to play of the selected image file in the mobile terminal on the display of the mobile terminal, displaying the images in an image display window within a second portion of the display of the mobile terminal that is different from the first portion.

14. The mobile terminal of claim 10, further comprising:
if the mobile terminal is connected to the external display device while the images are being played in the mobile terminal, displaying the images on the external display device and displaying the control menu on the display of the mobile terminal without displaying the images being played in the mobile terminal on the display of the mobile terminal.

15. The mobile terminal of claim 10, further comprising:
if the external display device is connected to the mobile terminal, controlling play of the images such that the images are displayed only on the external display device and the control menu is displayed only on the display of the mobile terminal.

16. The mobile terminal of claim 10, wherein the image data comprises a movie.

17. The mobile terminal of claim 10, wherein the image data comprises a game.

18. The mobile terminal of claim 10, wherein the control menu comprises one or more of a play control, a title, a play time, a progress time, and a progress bar.

* * * * *